United States Patent [19]
Weber

[11] 4,260,191
[45] Apr. 7, 1981

[54] METHOD AND APPARATUS TO CONTROL TENSION IN A TRAILING CABLE AND/OR WATERHOSE FOR A MINING MACHINE

[75] Inventor: Karl-Heinz Weber, Witten-Heven, Fed. Rep. of Germany

[73] Assignee: Gebr. Eickhoff Maschinenfabrik und Eisengeisserei m.b.H., Bochum, Fed. Rep. of Germany

[21] Appl. No.: 37,067

[22] Filed: May 8, 1979

[30] Foreign Application Priority Data

May 20, 1978 [DE] Fed. Rep. of Germany ....... 2822129

[51] Int. Cl.³ .............................................. E21C 29/16
[52] U.S. Cl. .................................... 299/1; 137/355.2; 191/12.2 A; 299/43
[58] Field of Search ......................... 299/1, 30, 42, 43; 191/12.2 A; 137/355.2

[56] References Cited

U.S. PATENT DOCUMENTS

| | | | |
|---|---|---|---|
| 3,113,763 | 12/1963 | Wendt et al. | 299/43 |
| 4,066,141 | 1/1978 | Elvin | 191/12.2 A X |
| 4,103,974 | 8/1978 | Nowacki et al. | 299/43 |

FOREIGN PATENT DOCUMENTS 1109531  4/1968  United Kingdom ...................... 299/43

*Primary Examiner*—Ernest R. Purser
*Attorney, Agent, or Firm*—Thomas H. Murray; Clifford A. Poff

[57] ABSTRACT

A signal is generated which varies with the distance between a mining machine and a cable trolley coupled by a rope to a winch disposed toward the lower drift of an inclined mine seam. The cable trolley moves along the face of the mine seam to guide and loop a trailing cable and/or water hose extending onto the mining machine. The winch is controlled in response to the signal for exerting tension inversely proportional to the distance between the cable trolley and the mining machine. The winch is driven by an electric torque motor or a hydraulic motor. In a further embodiment, the signal which is generated to control the winch varies the pull by the trailing cable and/or water hose upon the mining machine. This signal is used for controlling the winch in the same manner, namely, inversely proportional to the distance between the cable trolley and the mining machine.

20 Claims, 4 Drawing Figures

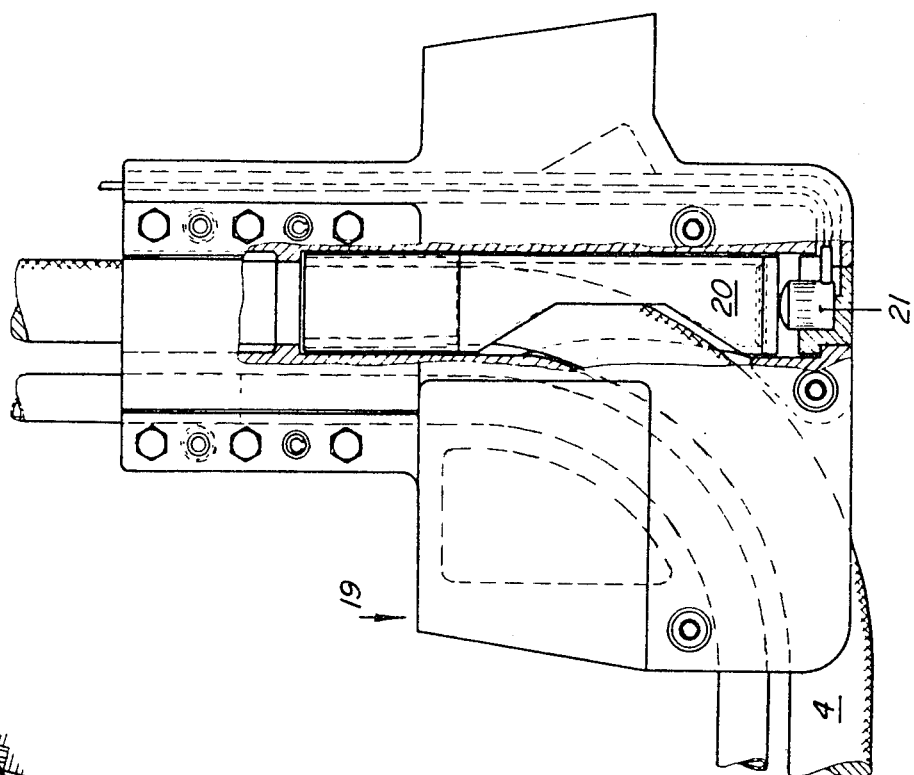
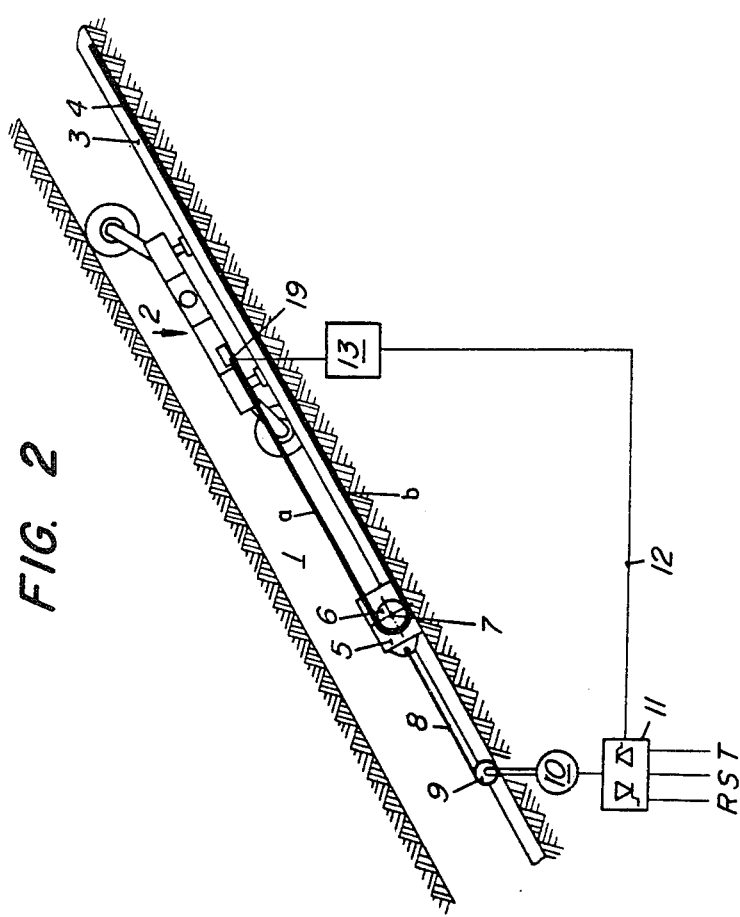

4,260,191

METHOD AND APPARATUS TO CONTROL TENSION IN A TRAILING CABLE AND/OR WATERHOSE FOR A MINING MACHINE

BACKGROUND OF THE INVENTION

This invention relates to a method and apparatus to control tensioning by a winch disposed toward the lower drift of an inclined mine seam and coupled by a tension means to a cable trolley adapted to move along the face of a mine seam to guide and loop a trailing cable and/or water hose extending onto the mining machine. More particularly, the present invention relates to such a method and apparatus wherein the winch is controlled in response to a signal that varies with the distance between the cable trolley and the mining machine or a signal which varies with the pull by the trailing cable and/or water hose upon the mining machine and using the signal for controlling the winch to exert tension inversely proportional to the distance between the cable trolley and the mining machine.

In U.S. Pat. No. 4,103,974, assigned to the Assignee of this invention, there is disclosed a cable carriage and spillplate housing assembly for a mining machine wherein the spillplate housing protectively encloses the cable carriage which includes a pulley to form a reverse bend in a cable. The cable extends along an internal duct in the housing and one end of the cable is connected to the mining machine. A tension reel includes a rope coupled to the cable carriage for advancing the carriage within the spillplate housing. The tension reel is supported at the end of the spillplate housing which is opposite from the end where the cable emerges from the housing. The cable includes an electrical power cable and hose which are separately carried by grooves in one or more pulleys. The cable carriage loops, guides and tensions the trailing cable by connection of the cable carriage to the tension reel forming a winch. The spillplate housing has a slot along the length thereof. The slot is normally closed by rubber strips to permit passage of the cable to the mining machine while moving along the course of travel at the mine face.

When the cable carriage or trolley is used to loop, guide and tension a drum-cutting mining machine disposed in an inclined mine seam, the tension or pull imposed on the trailing cable varies with the position of the cable trolley. The pull on the cable is produced by the tension exerted by the winch. The tension is transmitted by way of the cable trolley to the two portions of the looped and guided trailing cable. A pull is also imposed on the cable due to the downward force resulting from the weight of the trailing cable. This downward force varies with the slope of the seam and the length of the trailing cable portion extending from the cable inlet on the coal-cutting mining machine to the cable trolley. The downward force on the cable reaches a maximum when the mining machine is at the upper end of its travel where the cable trolley is located at the greatest distance from the mining machine; whereas the downward force on the cable is at a minimum when the cable trolley is at a point in travel closest to the mining machine which occurs at the lower end of the machine travel. The total force on the cable at the inlet on the mining machine is the sum of the downward force imposed on the cable and that portion of the tension imposed by the winch or tension reel upon the trailing portion of the cable. Consequently, when the mining machine moves, the pull by the trailing cable imposed on the cable inlet on the mining machine also varies continuously with the position of the cable trolley. The tension stress on the cable considerably affects its service life and, consequently, it is desirable to reduce the maximum value of the pull or tension on the cable and particularly fluctuations to the pull or tension.

SUMMARY OF THE INVENTION

It is an object of the present invention to reduce the maximum tension and fluctuations in the tension on a cable at an inlet therefor on a mining machine wherein the cable is a trailing and/or water hose looped and guided in an inclined mine seam.

In the method, according to the present invention, the tensioning by a winch is always inversely proportional to the distance between a cable trolley and the mining machine by actuating the drive for the winch in the appropriate direction according to a signal proportional to the distance between the cable trolley and the mining machine or according to a signal corresponding to the reciprocal of this distance. The tension produced by a winch operated in this manner is substantially adapted to the tensile force occurring as a downward force in that portion of the trailing cable which extends from the mining machine as far as the cable trolley. The tensioning by the winch is reduced as the distance between the mining machine and the trolley increases; whereas the tensioning by the winch is increased when the length of the cable between the mining machine and the trolley decreases. Since the tension or pull exerted by the trailing cable at the inlet for the cable on the mining machine is made up of the downward force on the cable and the tension force imposed on the cable by the winch, the pull or tension exerted on the cable at the inlet always remains substantially constant, or at least there is a considerable reduction to fluctuations in the tension near the cable inlet, thereby enhancing the service life of the trailing cable.

According to a further feature of the present invention, the distance between the cable trolley and the mining machine is measured by means of the winch cable drum or at the drive wheel of the mining machine winch used to move the mining machine forward. In this way, a signal corresponding to the distance or the reciprocal of the distance between the cable trolley and the mining machine is produced for use to actuate thyristors connecting the winch drive motor to the electrical power system or to actuate a hydraulic control circuit of a hydraulic drive for the winch. The signal corresponding to the distance between mining machine and the cable trolley is used either directly, in which case it has an inverse actuating effect on the winch drive, reducing the tension when the distance increases and increasing the tension when the distance decreases or, alternatively, the reciprocal of the signal is used to actuate the winch drive. To this end, the mining machine or the cable trolley is provided with a position indicator or the winch has an indicator operating in the same manner as a depth indicator to provide a signal for actuating the thyristors of the electric drive motor for a winch or actuating the hydraulic circuit for a hydraulic winch drive. Since the instantaneous position of the mining machine is always determinative of the particular position of the cable trolley and contrariwise, each position of the cable trolley always necessitates a particular position of the mining machine, the available position signal can be used directly to form a signal proportional to the distance between the cable trolley and the mining machine. This signal can be either converted into a reciprocal signal or used directly for inversely actuating the electric motor or hydraulic drive for the winch.

Alternatively, the signal for actuating the winch drive can be proportional or inversely proportional to the pull of the trailing cable in the neighborhood of the cable inlet on the mining machine. Such a signal includes both dynamic forces and frictional forces acting on the cable portion, namely, the actual downward force of the cable portion instead of taking into account the length of the cable portion corresponding to the distance between the cable trolley and the mining machine.

When the last-mentioned feature is used to solve the problem according to the present invention, then, according to a further advantageous feature, the force-receiving sleeve at the cable inlet on the mining machine bears upon a force transducer which is electrically connected to the winch drive and generates a signal proportional to the pull of the trailing cable and inversely actuating the thyristors of an electrical motor for the winch or directly actuating the hydraulic circuit for a hydraulically-powered winch. In this feature, the signal proportional to the pull can be converted into a reciprocal signal before use to actuate the winch drive.

Advantageously, the electric motor used for driving the winch takes the form of a torque motor. Even when such a motor does not rotate, the motor supplies adequate torque to the reduction gearing of the winch and, therefore, the motor is particularly suited for the intended purpose.

As a final advantageous feature of the present invention, when a hydraulically-driven winch is used, a slide valve is coupled to determine the load applied to the pump-adjusting means of the winch drive and the valve is actuated by the output signal from the position indicator for the mining machine or cable trolley or by the output signal of the indicator coupled to the winch or the output signal from the force transducer acted upon by the force-receiving sleeve at the cable inlet.

These features and advantages of the present invention as well as others will be more fully understood when the following description is read in light of the accompanying drawings, in which:

FIG. 2 is a view similar to FIG. 1 but illustrating a second embodiment of the present invention for tensioning the trailing cable;

FIG. 4 is an enlarged view, partly in section, showing a force-transducer at the cable inlet on a mining machine.

Figure 1:
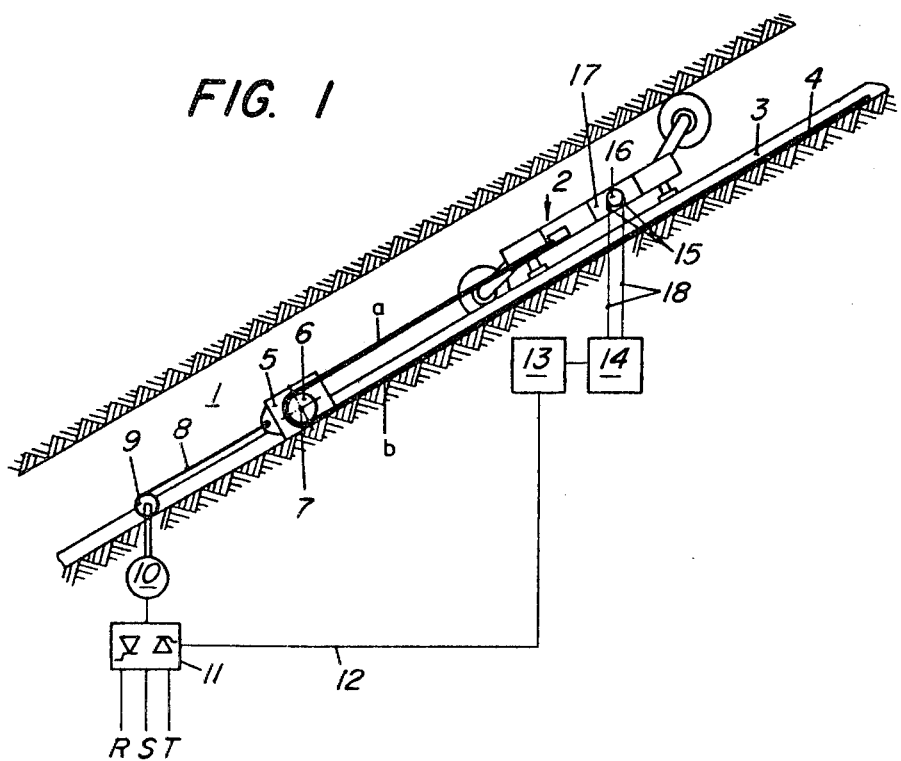
FIG. 1 is a schematic illustration of a drum-cutter mining machine in a working position in an inclined mine seam while the trailing cable is tensioned according to one embodiment of the present invention.
Figure 3:
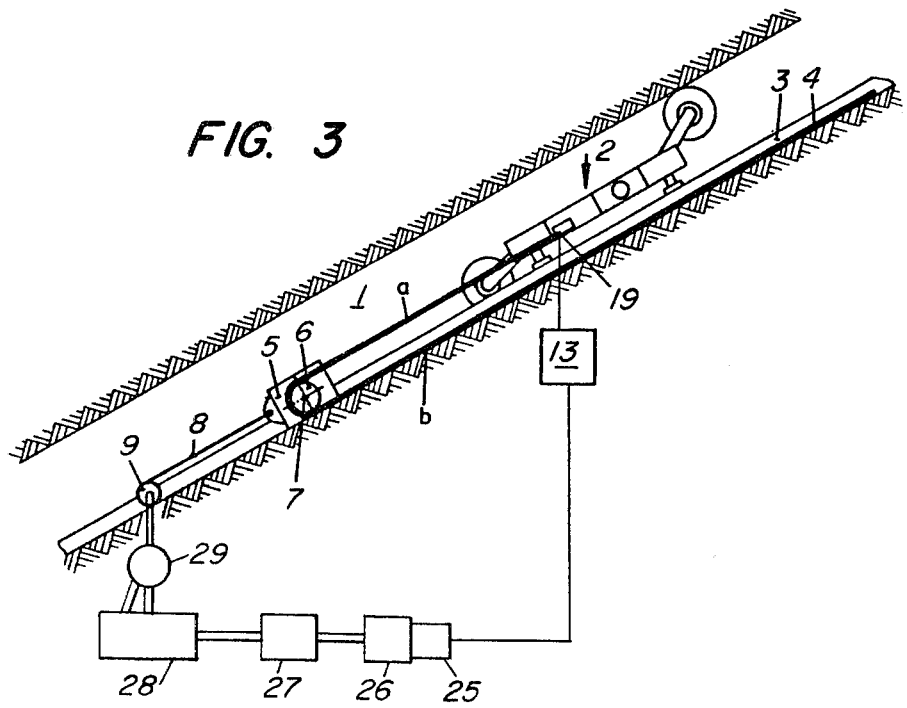
FIG. 3 is a view similar to FIGS. 1 and 2 and illustrating a schematic arrangement of parts for hydraulic tensioning of the trailing cable.

In FIGS. 1, 2 and 3, there is illustrated a drum-cutter mining machine 2 employed to loosen coal while moved back and forth along a mine seam 1. The mining machine is guided by and moves along the face conveyor 3 while supplied with electrical energy from a trailing cable 4 which extends from the upper seam road, not shown. The cable may include or comprise a water hose. A cable trolley 5 is disposed to move along the lower drift of the inclined mine seam below the mining machine. The cable trolley is used to loop and guide the trailing cable 4 and for tensioning two portions A and B of the cable loop. The trolley includes a roller 6 around which the trailing cable extends forming the loop in the cable. The roller is mounted to rotate about an axis which is parallel with the floor and at an angle to the mine face 1. The cable trolley 5 is on the stow side of the face conveyor and guided along a spillplate housing of the face conveyor or inside the cable duct of the spillplate housing. The cable trolley is connected by a cable 8 to a winch 9 disposed toward the lower drift of the inclined mine seam. The winch develops tension for tightening the trailing cable 4. The tension developed by the winch is transmitted by cable 8 to the trolley 5 and constantly subjects the trolley to a pull extending toward the lower gate (not shown).

In the embodiments of the invention shown in FIGS. 1 and 2, the winch 9 is driven by an electric motor 10 supplied with electrical energy under control by thyristors 11 from electric supply lines RST. Winch 9, which is in the lower part of the inclined mine seam in relation to the mining machine, may be driven by a hydraulic drive schematically illustrated in FIG. 3 and as also disclosed in West German Patent specification No. 11 83 040. The thyristors 11 used to actuate the winch drive motor 10, shown in FIGS. 1 and 2, are controlled by a signal delivered by a line 12 from an amplifier 13. In the embodiment of the present invention shown in FIG. 1, the amplifier 13 is downstream of a pulse shaper 14. When the mining machine 2 moves, the pulse shaper 14 is continuously supplied with signals from two detectors 15 which are associated with the drive wheel 16 of the mining machine winch 17. At each revolution of the wheel 16, each detector 15 produces a signal supplied to pulse shaper 14 through one of the lines 18. In rhythm with the production of these signals, the pulse shaper 14 delivers output signals to amplifier 13 wherein they are stored. During the storage process, the pulses are counted in dependence upon the direction of motion of the machine and amplifier 13 delivers a signal corresponding to the sum of the pulses, i.e., an increase in the stored pulses or a decrease in the stored pulses as the mining machine changes direction. The output signal from amplifier 13 is directly proportional to the distance between cable trolley 5 and the mining machine 2. This signal can be used to actuate the thyristors 11 for delivering electric power to the winch motor 10. If the signal is caused to act inversely upon a timing generator or firing circuit used to trigger the thyristors 11, then as a result, the torque developed by winch 9 increases when the sum of the pulses stored in the amplifier decreases and vice versa. Consequently, the tension developed by winch 9 always decreases when the mining machine moves upwardly along the inclined mine seam and the distance between the mining machine and trolley 5 decreases. Contrariwise, the tension by the winch always increases when the mining machine moves downwardly along the inclined mine seam and the distance between the mining machine and the cable trolley 5 decreases. The pull or tension by the winch is at a minimum when the mining machine is at the top end of its travel; whereas the winch exerts a maximum pull or tension when the mining machine is at the bottom end of the travel where the downward force on the cable portion A between trolley 5 and mining machine 2 is the smallest.

In the embodiment of the present invention shown in FIGS. 2 and 4, the cable inlet 19 on the mining machine 2 is equipped with a movable tension-receiving sleeve 20. The sleeve 20 bears on a force pickup or transducer 21 which is connected electrically to a firing circuit for thyristors 11 for controlling motor 10 or to the hydraulic drive for the winch 9 by way of amplifier 13. The transducer 21, which is, for example, a load cell, continuously delivers a signal directly proportional to the pull on the cable portion A between the trolley 5 and the mining machine 2 in the neighborhood of the sleeve 20. The signal produced by the transducer 21 is used to actuate motor 10 or the hydraulic drive for winch 9 so that the pull or tension produced by the winch decreases when the load on the sleeve increases and counterwise so that the pull or tension by the winch increases when the load decreases. As before, the signal produced by transducer 21 is directly proportional to the load on the sleeve and has a reverse actuating effect on the electric or hydraulic winch drive. Alternatively, in both examples, the winch drive can be actuated by means of a signal corresponding to the reciprocal of the distance between the trolley 5 and the mining machine 2 or the reciprocal of the load on sleeve 20, the signal being used for directly actuating the winch drive.

In FIG. 3, a signal produced in accordance with the embodiments of FIGS. 1 and 2 as described hereinbefore, is delivered via amplifier 13 to an actuator 25 to move a slide valve 26. The slide valve determines the load applied to a pump control 27 for a pump 28 that is coupled by fluid supply lines to a hydraulic motor 29. The torque output shaft of the motor is coupled to winch 9.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A method to control tensioning by a winch disposed toward the lower drift of an inclined mine seam and coupled by tensioning means to a cable trolley adapted to move along the face of the mine seam to guide and to loop a trailing cable and/or water hose extending onto the mining machine, said method including the steps of:
    generating a signal which varies with distance between said cable trolley and said mining machine, and
    controlling said winch in response to said signal in the appropriate direction for exerting tension by said winch inversely proportional to said distance.

2. The method according to claim 1 wherein said signal varies in accordance with the reciprocal of said distance.

3. The method according to claim 1 wherein said step of generating a signal includes using measuring means coupled to said winch to measure said distance between the cable trolley and the mining machine.

4. The method according to claim 1 wherein said step of generating a signal includes using measuring means coupled to a drive wheel of said mining machine to measure said distance between the cable trolley and the mining machine.

5. The method according to claim 3 or 4 wherein said step of controlling includes firing thyristors connected in the electrical supply for a drive motor of said winch.

6. The method according to claim 5 wherein said signal varies in accordance with the reciprocal of said distance.

7. The method according to claim 3 or 4 wherein said step of controlling includes actuating a hydraulic control of a hydraulic drive for said winch.

8. The method according to claim 7 wherein said signal varies in accordance with the reciprocal of said distance.

9. A method to control tensioning by a winch disposed toward the lower drift of an inclined mine seam and coupled by tensioning means to a cable trolley adapted to move along the face of the mine seam to guide and to loop a trailing cable and/or water hose extending onto the mining machine, said method including the steps of:
    generating a signal which varies with pull by said trailing cable and/or water hose upon said mining machine at the inlet area therefor, and
    controlling said winch in response to said signal in the appropriate direction for exerting tension by said winch inversely proportional to the distance between said cable trolley and said mining machine.

10. The method according to claim 9 wherein said signal varies in accordance with the reciprocal of said distance.

11. Apparatus to control tensioning by a wench disposed toward the lower drift of an inclined mine seam wherein said winch is coupled by tensioning means to a cable trolley adapted to move along the face of the mine seam for guiding and looping a trailing cable and/or water hose extending onto a mining machine, the combination therewith of said apparatus which includes:
    detecting means for providing a signal which varies with distance between said cable trolley and said mining machine,
    motor means for driving said winch, and
    control means responsive to said signal for controlling said motor means to exert tension by said winch inversely proportional to the distance between said cable trolley and said mining machine.

12. The apparatus according to claim 11 wherein said motor means is an electric motor, and wherein said control means includes thyristors.

13. The apparatus according to claim 11 wherein said motor means is an electric torque motor.

14. The apparatus according to claim 11 wherein said motor means includes a hydraulic actuator, and wherein said control means includes a hydraulic control circuit.

15. The apparatus according to claim 14 wherein said motor means includes a hydraulic motor, and wherein said control means includes a hydraulic pump having a pump-load adjusting member, a slide valve for controlling the load applied by said pump-load adjusting member on said hydraulic pump, and means responsive to said signal to actuate said slide valve.

16. Apparatus to control tensioning by a winch disposed toward the lower drift of an inclined mine seam wherein said winch is coupled by tensioning means to a cable trolley adapted to move along the face of the mine seam for guiding and looping a trailing cable and/or water hose extending onto a mining machine, the combination therewith of said apparatus which includes:
    detecting means for providing a signal which varies with pull by said trailing cable and/or water hose upon said mining machine at the inlet area therefor,
    motor means for driving said winch, and control means responsive to said signal for controlling said motor means to exert tension by said winch inversely proportional to the distance between said cable trolley and said mining machine.

17. The apparatus according to claim 16 wherein said detecting means includes a force-receiving sleeve receiving said cable and/or water hose on said mining machine, and a force transducer acted upon by said sleeve for producing said signal.

18. The apparatus according to claim 16 wherein said motor means is an electric motor, and wherein said control means includes thyristors.

19. The apparatus according to claim 16 wherein said motor means is an electric torque motor.

20. The apparatus according to claim 17 wherein said motor means includes a hydraulic motor, and wherein said control means includes a hydraulic pump having a pump-load adjusting member, a slide valve for controlling the load applied by said pump-load adjusting member on said hydraulic pump, and means responsive to said signal to actuate said slide valve.

* * * * *